United States Patent [19]

Witzig et al.

[11] Patent Number: 5,027,067
[45] Date of Patent: Jun. 25, 1991

[54] MEASURING DEVICE FOR CONTACTLESS MEASUREMENT OF A ROTATIONAL ANGLE OF A ROTATING SHAFT USING EDDY CURRENTS

[75] Inventors: Armin Witzig, Renningen; Hansjoerg Hachtel, Weissach, both of Fed. Rep. of Germany

[73] Assignee: Robert Bosch GmbH, Stuttgart, Fed. Rep. of Germany

[21] Appl. No.: 487,516

[22] Filed: Mar. 2, 1990

[30] Foreign Application Priority Data

May 24, 1989 [DE] Fed. Rep. of Germany ....... 3916864

[51] Int. Cl.$^5$ .......................... G01B 7/30; G01B 7/14
[52] U.S. Cl. .............................. 324/207.19; 324/164; 324/207.22; 324/207.25
[58] Field of Search ........... 324/164, 173, 174, 207.16, 324/207.19, 207.22, 207.25; 73/517 R, 518, 519; 123/414, 617; 340/870.31–870.33; 137/553, 554; 336/45, 130, 134, 135; 341/15; 310/68 B

[56] References Cited

U.S. PATENT DOCUMENTS

| | | | |
|---|---|---|---|
| 3,178,641 | 4/1965 | Varterasian | 324/164 |
| 3,281,682 | 10/1966 | Bauerlein | 324/164 |
| 4,080,532 | 3/1978 | Zabler . | |
| 4,186,609 | 2/1980 | Baermann | 324/164 X |
| 4,240,302 | 12/1980 | Karnick | 73/519 X |
| 4,529,933 | 7/1985 | Bleeke | 324/173 |
| 4,637,478 | 12/1986 | Unetsch et al. . | |

FOREIGN PATENT DOCUMENTS

| | | | |
|---|---|---|---|
| 924714 | 5/1963 | United Kingdom | 324/207.22 |
| 2062782 | 5/1981 | United Kingdom . | |

Primary Examiner—Gerard R. Strecker
Attorney, Agent, or Firm—Edwin E. Greigg; Ronald E. Greigg

[57] ABSTRACT

A device for contactless measurement of a rotational angle of a rotating part that is rotatable via a rotating shaft. The device includes a cylindrical coil carrier with sensor coils and a tubular body of electrically conductive material that is firmly attached to the rotating shaft and which surrounds the coil carrier with radial play and has an electrically non-conductive zone extending circumferentially in the vicinity of the sensor coils. For the sake of an easy-to-assemble structure, the tubular body is slipped onto a face end of the rotating shaft in a form-fitting manner and the tubular body is surrounded with radial play by a housing cup, from the bottom of which the coil carrier, which is integral with it, coaxially protrudes. The housing cup is joined in a floating manner to a housing that receives the rotating part.

11 Claims, 1 Drawing Sheet

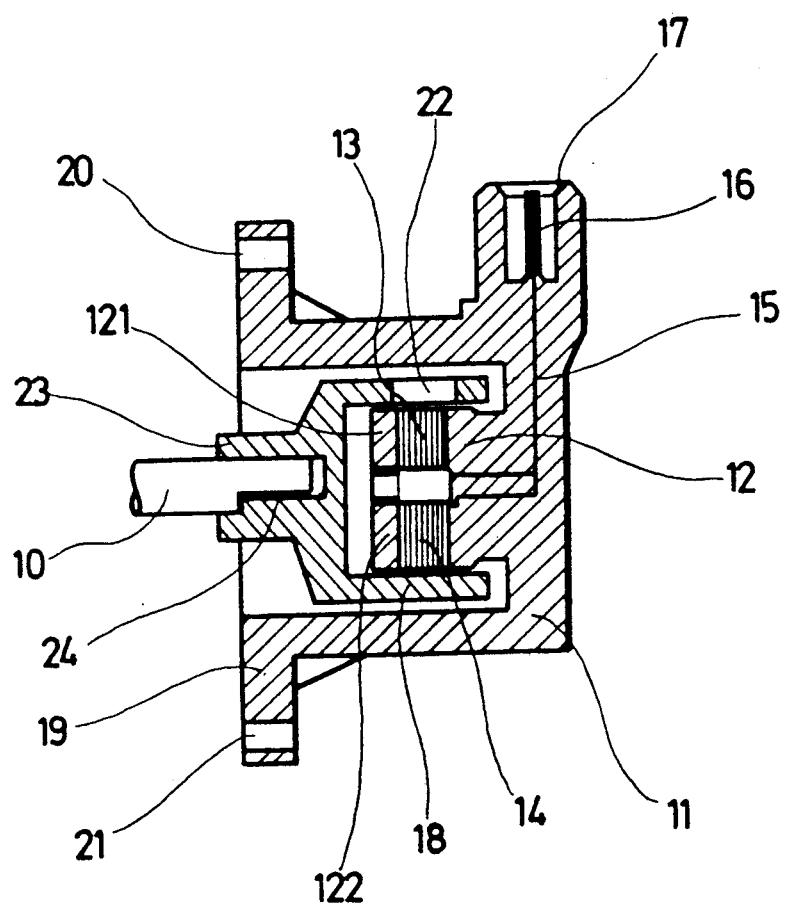

MEASURING DEVICE FOR CONTACTLESS MEASUREMENT OF A ROTATIONAL ANGLE OF A ROTATING SHAFT USING EDDY CURRENTS

BACKGROUND OF THE INVENTION

The invention relates to a device for contactless measurement of a rotational angle of a rotating part that is rotatable via a rotating shaft, in particular a throttle valve seated on a control shaft in internal combustion engines in a manner fixed against relative rotation, of the type defined hereinafter.

A measuring device of this type is distinguished by a relatively small structural volume and is suitable for contactless measurement of rotational angles up to 180°. The measuring device includes a tubular body and operates on an eddy current principle, to which end sensor coils are subjected to a flow of a high-frequency alternating current. The resultant magnetic alternating fields of the coils generate eddy currents on the surface of the tubular body. The greater the surface area of the tubular body penetrated by the magnetic field, the more eddy currents are created. These eddy currents cause a reduction in the alternating current resistance of the sensor coils. Upon a rotational motion of the tubular body, the surface area penetrated by the alternating magnetic fields is altered asymmetrically by electrically nonconductive zones, so that in one sensor coil the alternating current resistance increases, while in the other sensor coil the alternating current resistance decreases. Depending on the number, the sensor coils are disposed in a half or full Wheatstone bridge circuit, so that measurement errors occurring at the same time and acting in the same direction are compensated for. The outset voltage of the half or full bridge is a standard for the measured rotational angle.

In this kind of measuring instrument, it is often quite complicated to connect the measuring instrument structurally with the rotating part in terms of the effort of assembly, because the tubular body must be guided around the coil carrier with radial play.

OBJECT AND SUMMARY OF THE INVENTION

The measuring instrument according to the invention has an advantage of a structural design that allows time-saving and cost-reducing assembly of the measuring instrument on the rotating part for measuring the rotational angle position of the rotating part.

After the tubular body has been slipped onto the rotating shaft, or in the case of a throttle valve, on the throttle valve control shaft, the housing cup that integrally includes the coil carrier is secured with its securing flange to the housing surrounding the rotating part, or in the case of the throttle valve to the intake tube of the engine. As soon as the measurement cable is inserted into the electrical measurement socket, the assembly is already complete. The radial play between the tubular body and the coil carrier that enables the relative rotation of these two parts is automatically assured, particularly if the housing cup is secured "floatingly".

The measuring instrument according to the invention is simple in structure and can be manufactured in a cost-saving manner. For instance, the tubular body needs no bearings at all, because it is rigidly supported by the rotating shaft.

In a preferred feature of the invention, the slip-on opening in the slip-on tang of the tubular body is embodied such that the tubular body, when slipped onto the correspondingly embodied end of the rotating shaft, or in the case of the throttle valve the throttle valve control shaft, is automatically positioned correctly, so that the measuring instrument furnishes a correct signal corresponding to the rotational position of the rotating part.

The invention will be better understood and further objects and advantages thereof will become more apparent from the ensuing detailed description of a preferred embodiment taken in conjunction with the drawing.

BRIEF DESCRIPTION OF THE DRAWING

The sole figure of the drawing is a schematic longitudinal section through a throttle valve position transducer.

DESCRIPTION OF THE PREFERRED EMBODIMENT

The throttle valve position transducer, shown merely schematically in longitudinal section in FIG. 1, measures the pivoted position of the throttle valve, disposed in the intake tube of an internal combustion engine. The position transducer is seated on a control shaft 10 of the throttle valve in a manner fixed against relative rotation, and emits an electrical output signal corresponding to the angle by which the throttle valve has pivoted or rotated out of its position of repose. This throttle valve position transducer is merely one example of a measuring instrument for contactless measurement of the rotational angle of an arbitrary rotating part that is secured to a rotating shaft in a manner fixed against relative rotation.

The measuring device comprises a housing cup 11; from its bottom, a cylindrical coil carrier 12 that is integral with the housing cup protrudes coaxially from the housing cup 11. The coil carrier 12 is slit on its face end, forming two semicircular cores 121 and 122, respectively. One sensor coil 13 and 14 each is wound onto the cores 121 and 122. The ends of the windings of the two sensor coils 13, 14 are connected, via separate electrical leads 15 extending in an electrically insulated manner in the housing cup 11, with plug contacts 16 of a multipole socket 17, which may be equipped with a multistrand measuring cable. The measuring cable, not shown here, connects the measuring device to a voltage meter, and via the measuring cable the wiring of the sensor coils 13, 14 is selected such that they are located in a Wheatstone half bridge circuit; as a result, measurement errors arising at the same time and acting in the same direction in the sensor coils 13, 14 are compensated for. On its rim remote from the bottom, the housing cup 11 is provided with an integral flange 19, which has at least two through bores 20 and 21, offset from one another by equal circumferential angles; fastening screws, not shown here, can be inserted through these bores. These fastening screws secure the housing cup 11 in a floating manner to the intake tube of the engine, coaxially with the control shaft 10.

The sensor coils 13, 14 wound circumferentially on the cores 121 and 122 on the coil carrier 12 are surrounded, with little radial play, by a tubular body 18 that is surrounded in turn by the housing cup 11. The tubular body 18 comprises metal, electrically conductive and/or ferromagnetic material. The tubular body 18 has a slit 22, which extends circumferentially over the tubular body 18 over an angle of 180°. The axial width of the slit 22 is approximately equivalent to the axial length of the sensor coils 13, 14. Instead of the slit 22, a zone of the same dimensions made of electrically nonconductive material may be provided in the tubular body 18. Aluminum may be used, for example.

At its face end, the tubular body 18 merges integrally with a coaxial slip-on tang 23, which includes a slip-on opening 24 protruding from the face end of the slip-on tang 23 into the interior. The slip-on opening 24 is embodied such that once the slip-on tang 23 is slipped onto the free end of the control shaft 10, the tubular body 18 is seated on the control shaft 10 in a manner fixed against relative rotation by both a form-fitting and a force-locking engagement. The form-fitting and force-locking engagement can for instance be brought about by machining the end portion of the control shaft 10 down to the diameter, removing half of it, and the slip-on opening 24 can have a correspondingly semicircular cross section. The relative position of the cross section of the slip-on opening 24 to the slit 22 in the tubular body 18 is defined in such a way that when the control shaft 10 is in the zero position of the throttle valve, the slit 22 covers a portion of both sensor coils 13, 14 with zone segments of identical size, seen in the circumferential direction.

If the control shaft 10 and throttle valve is rotated by the throttle valve position transducer by a rotational angle, then the tubular body 18 rotates by the same rotational angle. As a result, the zonal portion that covers the one sensor coil 13 is enlarged, while the zonal portional that covers the other sensor coil 14 becomes smaller. Because of the eddy currents, generated as described at the outset above on the surface of the tubular body 18, the alternating current resistance of the sensor coil 13 is decreased and the eddy current resistance of the sensor coil 14 is increased. This imbalances the Wheatstone half bridge, and the output signal of the Wheatstone half bridge is an exact standard for the rotational angle of the tubular body 18 and hence of the control shaft 10.

The invention is not limited to the above-described exemplary embodiment of the throttle valve position transducer. For instance, the number of sensor coils 13, 14 on the coil carrier could be increased, for instance to four sensor coils, each disposed offset by 90° around the circumference. In that case, two slits are provided in the tubular body 18, each extending over 90° of the circumference and being offset from one another by 90°. In general, it can be stated that the length of the slits is equal to the circumference of the tubular body, divided by the number of sensor coils. The number of slits is equivalent to the number of pairs of sensor coils present. With an increasing number of sensor coils, however, the measurable rotational angle of the control shaft 10 becomes smaller. It is at a maximum when two sensor coils are used, as shown in the drawing, and in that case amounts to 180°. The sensor coils can also—if this is more favorable from a manufacturing standpoint—be wound around individual cores, which are for instance firmly joined to the housing cup 11 by adhesive.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the U.S. is:

1. A measuring device for contactless measurement of a rotational angle of a rotating part rotatable via a rotating shaft, which comprises a housing cup (11) which includes a coaxial, integral cylindrical coil carrier (12) protruding from a bottom thereof, said cylindrical coil carrier includes at least two sensor coils, disposed offset by like circumferential angles in a circumferential direction and having coil axes parallel to the cylindrical coil carrier axis, a tubular body which can be firmly joined to the rotating part, said tubular body including a tubular portion that surrounds the coil carrier and sensor coils leaving a radial spacing therebetween, said tubular portion is formed of electrically conductive material including at least one radial electrically non-conducting portion extending in a circumferential direction in an area opposite said coil carrier and sensor coils, the circumferential length of said radial electrically non-conducting portion is approximately equivalent to a circumference of said tubular body portion divided by a number of sensor coils included on said cylindrical coil carrier, said tubular body (18) includes a protruding slip-on tang (23) integrally coaxial therewith, said slip-on tang includes a slip-on opening (24) which form-fittingly slips onto an end of a rotating shaft (10), and that said tubular body (18) is surrounded with a radial spacing by said housing cup (22), and said housing cup includes a securing flange (19) which provides a floating connection with a housing receiving the rotating part.

2. A measuring device as set forth in claim 1, in which said radial electrically non-conducting portion of said tubular portion of said tubular body is a radial slit having a width approximately that of a tubular body axial length of said coils.

3. A measuring device as set forth in claim 1, in which said radial electrically non-conducting portion of said tubular portion of said tubular body is a material of electrically non-conducting material.

4. A measuring device as set forth in claim 1, in which said tubular body is formed of ferromagnetic material.

5. A measuring device as defined by claim 1, in which said form-fitting slip-on opening (24) and the rotating shaft end for insertion into the slip-on opening (24) are embodied correspondingly, in such a manner that when the rotating part is in its zero position, the tubular body (18) assumes a rotational position in which the radial electrically non-conductive zone (22) covers two adjacent sensor coils (13, 14), each with identically sized covered portions.

6. A measuring device as defined by claim 1, in which said housing cup (11) has a multi-pole connection socket (17) electrically conductively connected to the ends of the windings of the sensor coils (13, 14).

7. A measuring device as defined by claim 2, in which said housing cup (11) has a multi-pole connection socket (17) electrically conductively connected to the ends of the windings of the sensor coils (13, 14).

8. A measuring device as defined by claim 1, in which said securing flange (19) has through bores (20, 21) offset by a like circumferential angle for passage therethrough of fastening screws.

9. A measuring device as defined by claim 5, in which said securing flange (19) has through bores (20, 21) offset by a like circumferential angle for passage therethrough of fastening screws.

10. A measuring device as defined by claim 6, in which said securing flange (19) has through bores (20, 21) offset by a like circumferential angle for passage there-through of fastening screws.

11. A measuring device as defined by claim 7, in which said securing flange (19) has through bores (20, 21) offset by a like circumferential angle for passage there-through of fastening screws.

* * * * *